United States Patent Office 3,248,386
Patented Apr. 26, 1966

3,248,386
6-(TETRAHYDRO-1'-NAPHTHOYLAMINO)-
PENICILLANIC ACID DERIVATIVES
Scott J. Childress, Newtown Square, Pa., assignor to American Home Products Corporation, New York, N.Y., a corporation of Delaware
No Drawing. Filed Dec. 30, 1960, Ser. No. 79,531
2 Claims. (Cl. 260—239.1)

This invention relates to new synthetic compounds of value as antibacterial agents, as nutritional supplements in animal feeds, and as therapeutic agents in both veterinary and human medicine for treatment of infectious diseases caused by gram-positive bacteria; more particularly, it relates to novel 6-acylaminopenicillanic acid compounds.

Antibacterial agents of the penicillin family have proved highly effective in the past in the therapy of infections due to gram-positive bacteria, but most such agents suffer from the serious drawback of being ineffective against numerous resistant strains of pathogenic bacteria, particularly various staphylococci. The compounds of the present invention exhibit unusually good activity against many of these strains of staphylococci which are resistant to other penicillins, and are accordingly valuable in combating infections caused by these organisms. The compounds of this invention may be administered orally but are preferably administered parenterally, as by intravenous or intramuscular injections, as solutions or suspensions. They are of very low toxicity to mammals and are well tolerated even in large dosages.

The novel 6-acylaminopenicillanic acid compounds of this invention may be represented by the formula

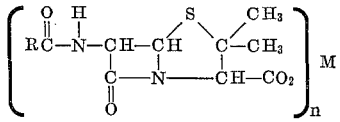

in which M represents hydrogen or a positive ion derived from an inorganic or organic base (e.g. Na, K, Ca, Mg, Al, $NH_4$, substituted ammonium, etc), $n$ is a small integer equal to the positive valence of M, and R represents an alkoxylated radical having the carbon skeleton of the naphthyl radical. The radical R may have the same number and arrangement of double bonds as in naphthalene, or may be partially or completely hydrogenated. Of special importance are the compounds in which R is an alkoxylated naphthyl radical or an alkoxylated 5,6,7,8-tetrahydronaphthyl radical. Particularly valuable are compounds in which R represents a 1-naphthyl or a 5,6,7,8-tetrahydro-1-naphthyl radical, each substituted in the 2-position by a lower alkoxyl such as methoxyl or ethoxyl.

Very surprisingly, it has been found that the penicillins of the present invention, containing as they do, an alkoxylated naphthoyl radical (hydrogenated or not, as the case may be), have unusually great effectiveness against many of the bacterial strains which have in recent years been found to be highly resistant to penicillins previously used in medicine. The development of penicillin resistance among pathogenic bacteria, or rather, perhaps, the emergence and multiplication of penicillin-resistant strains of these bacteria, has presented the medical profession with a very grave challenge. The provision of modified penicillins able to cope with this challenge is obviously a very great benefit to medicine.

The new synthetic penicillins of this invention may be prepared conveniently by N-acylation of 6-aminopenicillanic acid, using a suitable acid halide, preferably an acid chloride. A convenient method of conducting this acylation comprises suspending 6-aminopenicillinic acid in a suitable inert reaction medium, adding at least an equivalent amount of a tertiary amine, and then adding slowly and with good agitation the acid halide. The reaction may be conducted at room temperature, below room temperature, or even above room temperature; however, since 6-aminopenicillanic acid and its acylation products may undergo decomposition at elevated temperatures, it is preferred to operate below about 50° C., preferably at about room temperature or below. The reaction medium employed should be a solvent for the acid halide and the tertiary amine employed and should be free of reactive hydrogen atoms. Among suitable solvents for employment as the reaction medium are chloroform, methylene chloride, dioxan, dimethylformamide, dimethylacetamide, acetone, and methylisobutylketone. Because of their very desirable solvent powers, volatility, inertness, and water immiscibility, I prefer to employ chloroform or methylene chloride as the acylation medium.

As above stated, a tertiary amine is employed in the acylation step; this is to react with the co-produced hydrogen halide. Triethylamine is very suitable, but other tertiary amines may be employed instead, such as tributyl amine, pyridine, dimethyl aniline, N-ethyl morpholine, N-ethyl piperidine, etc.

It is ordinarily sufficient to add the acid halide at room temperature to a suspension of the 6-aminopenicillanic acid in the reaction medium (e.g., chloroform) containing the tertiary amine (e.g., triethylamine), and stir for about five to ten minutes. The reaction mixture may then be washed with acidulated water, extracted with aqueous sodium bicarbonate solution, and the extract worked up to recover the 6-acylaminopenicillanic acid compound.

The acylation product is normally recovered from the reaction mixture in which it is formed either as the free acid or as a salt, suitably the potassium or sodium salt. As is usual in the penicillin series, the free acids do not crystallize well and are usually obtained only as brittle resins having no sharp melting point. The salts of my novel 6-acylaminopenicillanic acids, on the other hand, usually crystallize well. The alkali metal salts may be crystallized by concentrating their aqueous solutions or by adding ether to their solutions in acetone.

If desired, the free acid or a salt, for example, the potassium salt, may be converted by metathetic reaction to another salt. Thus, by mixing an aqueous solution of the potassium salt of one of the new penicillins of this invention with an aqueous solution of the acetate of N,N'-dibenzylethylenediamine, one obtains a crystalline precipitate of the dibenzylethylenediamine salt of the new penicillin. Other salts, if desired, may be prepared similarly. Thus by mixing a concentrated aqueous solution of the potassium or sodium salt of one of my new 6-acylaminopenicillanic acids with an aqueous solution of dibenzylamine acetate, I obtain a precipitate of the corresponding dibenzylamine penicillin. By using N,N'-diabietyl ethylene diamine acetate, I obtain crystals of the diabietyl ethylene diamine penicillin. In like manner, there may be obtained salts of my novel 6-acylaminopenicillanic acids with other non-toxic amines such as triethylamine, procaine, N - benzyl - beta - phenethylamine, benzhydrylamine, 1-ephenamine, dehydroabietylamine, N-(lower)alkylpiperidines, and other amines which have been used to form salts with penicillins.

It is to be noted that by the expression "6-acylaminopenicillanic acid compounds," as used herein, I intend not merely the acids but also their non-toxic and pharmaceutically acceptable metal (e.g., sodium, potassium, calcium, magnesium, aluminum, etc.) and ammonium salts, including salts of organic amines, quaternary ammonium salts and salts of complex polyfunctional amines such, for example, as N,N'-dibenzylethylenediamine. As is well known, it is frequently preferred in therapeutic applications of penicillin to employ it in a sparingly soluble form in order to prolong its retention in the body and maintain therapeutically effective concentrations in the blood for a prolonged period. To this end, it is common practice to employ penicillin salts of relatively high-molecular weight amines. Among the most satisfactory and widely used forms have been the penicillin salts of N,N'-dibenzylethylenediamine. Various penicillin salts of rosin amines have also been suggested, as have many other salts formed from various penicillins and high-molecular weight pharmacologically acceptable amines. As above pointed out, the novel penicillins of this invention may be converted to such relatively slightly soluble amine salts to provide lengthened time of retention and maintenance of satisfactory blood levels in the animal or human organism.

The following examples, intended to be illustrative only, will serve to show how this invention may be practiced.

*Example 1*

6-aminopenicillanic acid (0.8 g.) was suspended in 20 ml. of alcohol-free chloroform containing 0.8 g. of triethylamine. To this suspension was added the acid chloride prepared by treatment of 0.8 g. of 2-methoxynaphthoic acid with excess thionyl chloride and removal of the excess reagent in vacuo. Addition took 5 minutes. The suspension cleared up at once and was stirred for an additional 5 minutes. The solution was washed with water, dilute sulfuric acid being added to develop a pH of 2. The chloroform layer was separated and extracted with saturated sodium bicarbonate solution. The extract was washed with ether, covered with 10 ml. of methyl isobutyl ketone, and acidified with dilute sulfuric acid to pH 2. The organic extract was dried over magnesium sulfate and filtered. Addition of potassium 2-ethylhexanoate in methyl isobutyl ketone gave a gummy precipitate that was triturated with ether. It was then dissolved in water and concentrated in vacuo to leave pale yellow crystals of 6-(2'-methoxy-1'-naphthoylamino)penicillanic acid, potassium salt, monohydrate, slowly decomposing above 115° C.

*Analysis.*—Calcd. for $C_{20}H_{19}O_5N_2SK \cdot H_2O$: C, 52.60; H, 4.64. Found: C, 52.58; H, 4.85.

In a second preparation, the gummy precipitate obtained upon addition of the potassium 2-ethylhexanoate was triturated with anhydrous ether until a cream-colored powder resulted. This anhydrous salt slowly decomposed above 125° C.

*Analysis.*—Calcd. for $C_{20}H_{19}O_5N_2SK$: C, 54.77; H, 4.37. Found: C, 54.78; H, 4.98.

In an exactly similar preparation, anhydrous potassium 6-(2'-ethoxy-1'-naphthoylamino)penicillanate was made. This product slowly shrank and decomposed above 120° C.

*Example 2*

A suspension of 4.5 g. of 6-aminopenicillanic acid in 50 ml. of alcohol-free chloroform containing 4.5 g. of triethylamine was slowly treated with a solution of 4.5 g. of 5,6,7,8-tetrahydro-2-methoxy-1-naphthoyl chloride in 15 ml. of chloroform. After stirring for ½ hour the mixture was worked up as described in Example 1, triturating with ether to afford the anhydrous potassium salt of 6 - (2' - methoxy - 5',6',7',8'-tetrahydro-1'-naphthoylamino)penicillanic acid, slowly decomposing above 125° C.

*Analysis.*—Calcd. for $C_{20}H_{23}O_5N_2SK$: C, 54.27; H, 5.24. Found: C, 54.28; H, 5.47.

*Example 3*

A solution of 0.4 g. of 6-(2'-methoxy-5',6',7',8'-tetrahydro - 1' - naphthoylamino)penicillanic acid, potassium salt, in 10 ml. of water, was mixed with a solution of 0.2 g. of N,N'-dibenzylethylenediamine acetate in 5 ml. of water. The resulting precipitate was filtered off and washed with acetone giving crystals that melted 123–125° C. dec.

*Analysis.*—Calcd. for $C_{20}H_{24}O_5N_2S \cdot \frac{1}{2}C_{16}H_{20}N_2 \cdot H_2O$: C, 61.97; H, 6.69. Found: C, 62.30; H, 6.85.

*Example 4*

In the same way as that described in Example 3, the dibenzylethylene diamine salt of 6-(2'-methoxy-1'-naphthoylamino)penicillanic acid was prepared. It melted at 137–139° C. dec.

*Analysis.*—Calcd. for $C_{20}H_{20}O_5N_2S \cdot \frac{1}{2}C_{16}H_{20}N_2 \cdot H_2O$: C, 62.43; H, 5.99. Found: C, 62.56; H, 5.93.

The 2-ethoxy analog was also converted into its dibenzylethylenediamine salt. It had M.P. 127–129° C. dec.

*Analysis.*—Calcd. for $C_{21}H_{22}O_5N_2S \cdot \frac{1}{2}C_{16}H_{20}N_2 \cdot H_2O$: C, 63.02; H, 6.20. Found: C, 62.88; H, 6.11.

*Example 5*

The anhydrous sodium salt of 6-(2'-methoxy-1'-naphthoylamino)penicillanic acid was made following the procedure of Example 1 but employing sodium 2-ethylhexanoate instead of potassium 2-ethylhexanoate. It decomposes slowly above 150° C.

*Analysis.*—Calcd. for $C_{20}H_{19}O_5N_2SNa$: C, 56.86; H, 4.53. Found: C, 56.73; H, 5.04.

What is claimed is:
1. 6 - (2' - methoxy - 5',6',7',8' - tetrahydro - 1' - naphthoylamino)penicillanic acid.
2. N,N' - dibenzylethylenediamine di - 6 - (2' - methoxy - 5',6',7',8' - tetrahydro - 1' - naphthoylamino)penicillinate.

References Cited by the Examiner

UNITED STATES PATENTS 2,941,995   6/1960   Doyle et al. _____ 260—239.1

FOREIGN PATENTS 569,728   11/1958   Belgium.
590,744   11/1960   Belgium.

NICHOLAS S. RIZZO, *Primary Examiner.*

IRVING MARCUS, *Examiner.*

JAMES W. ADAMS, *Assistant Examiner.*